(12) United States Patent
Matsuda et al.

(10) Patent No.: US 7,034,852 B2
(45) Date of Patent: Apr. 25, 2006

(54) PROJECTION SYSTEM, PROJECTOR, PROGRAM, INFORMATION STORAGE MEDIUM AND IMAGE PROCESSING METHOD

(75) Inventors: Hideki Matsuda, Fujimi-machi (JP); Kenji Fukasawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 415 days.

(21) Appl. No.: 10/376,256

(22) Filed: Mar. 3, 2003

(65) Prior Publication Data
US 2003/0193566 A1    Oct. 16, 2003

(30) Foreign Application Priority Data
Mar. 26, 2002  (JP) .............................. 2002-085409

(51) Int. Cl.
*G09G 5/10* (2006.01)
(52) U.S. Cl. ...................... 345/690; 345/158; 345/589
(58) Field of Classification Search ................ 345/158, 345/589, 690, 600–601, 418, 345
See application file for complete search history.

(56) References Cited

U.S. PATENT DOCUMENTS

| | | | |
|---|---|---|---|
| 5,287,173 A * | 2/1994 | Onuma et al. ............. | 348/655 |
| 5,561,459 A | 10/1996 | Stokes et al. | |
| 6,115,022 A * | 9/2000 | Mayer et al. ............... | 345/418 |
| 2002/0089489 A1 * | 7/2002 | Carpenter ................... | 345/158 |
| 2003/0052890 A1 * | 3/2003 | Raskar et al. ............... | 345/581 |

FOREIGN PATENT DOCUMENTS

| | | |
|---|---|---|
| EP | 1 178 672 A2 | 2/2002 |
| JP | A 8-79546 | 3/1996 |
| JP | A 9-258939 | 10/1997 |
| JP | A 2000-082137 | 3/2000 |
| WO | WO99/23637 | 5/1999 |
| WO | WO 01/91099 A1 | 11/2001 |

* cited by examiner

*Primary Examiner*—Amr A. Awad
*Assistant Examiner*—Kimnhung Nguyen
(74) *Attorney, Agent, or Firm*—Oliff & Berridge, PLC (57) ABSTRACT

In order to provide a projection system, projector, program, information storage medium and image processing method which can reduce an unpleasantness to an observer in an image calibration when it is executed in consideration of the ambient light, a calibration information output section selects and outputs calibration information, a color light sensor then measures XYZ values in the respective projected calibration images, and a measurement data is then stored in a sensing value holding section, when a synchronizing signal judgment section judges that no synchronizing signal has been inputted. When all the color correcting measurement data have been provided, a 3D-LUT update section updates a 3D-LUT stored in the 3D-LUT storage section, based on the measurement data. When all the brightness correction measurement data have been provided, a 1D-LUT update section updates a 1D-LUT stored in a 1D-LUT storage section to execute the calibration, based on the measurement data.

21 Claims, 6 Drawing Sheets

PROJECTION SYSTEM, PROJECTOR, PROGRAM, INFORMATION STORAGE MEDIUM AND IMAGE PROCESSING METHOD

Japanese application no. 2002-85409, filed on Mar. 26, 2002, is hereby incorporated by reference in its entirety.

BACKGROUND OF THE INVENTION

The present invention relates to a projection type image display system, projector, program, information storage medium and image processing method which can execute a calibration in consideration of the influence of ambient light as well as the plane of projection.

When an image is to be projected through a projection type image display system such as projector, the image appearance may be varied under influence of the ambient light such as illuminating or external light and/or under influence of the plane of projection such as screen or wall. In order to reproduce an ideal image appearance by correcting the varied image appearance, an image display system has been proposed which is designed to automatically correct the image information based on measurements of calibration images and to project an image based on the corrected image information.

For example, Japanese Patent Laid-Open Application No. 2000-82137 discloses an image display system which corrects and displays an image by selecting and reading a desired brightness regulating value from a plurality of previously stored brightness regulating values, based on the value of illuminance. Such a system was generally used in the conventional art for correcting the image by selecting and reading a regulating value depending on the measured illuminance.

When the illuminance is used, however, the image display device can correct the brightness of the image, but not the color in the image.

When an image is displayed on a monitor or the like, the image display device can relatively simply and easily determine the regulating value based on only the illuminance because the material of the image display area is always invariable in property. When an image is projected onto a screen or the like, the image appearance will be varied depending on the color and property of the screen material in addition to the illuminance because the color (spectral reflectance) and property of the screen material are variable.

Even though the conventional system for selecting and applying the regulating values is taken, the image display device cannot properly regulate the image appearance unless the color and material of the screen are considered.

It is general that the distance of projection between the projection type image display device and the screen is variable. The amount of projected light per unit area on the screen will be varied depending on the distance of projection. Even if the ambient light is invariable, the image appearance will be varied depending on the amount of projected light per unit area.

Even when the conventional system for selecting and applying the regulating values is taken, therefore, the image display device cannot properly regulate the image appearance unless the distance of projection is also considered.

Particularly, when the image display device is to correct both the brightness and color of an image, a huge amount of data relating to regulating values to be previously stored will be required even though a system is taken which is designed to determine a regulating value based on the color and material of the screen as well as the distance of projection in addition to the illuminating light. The previous setting of regulating values is not practical.

Rather than the screen, a wall may be used as the plane of projection. In this case, it is extremely difficult to previously provide regulating values for every wall having different colors and materials.

Since an image projected by the image display device is usually observed by a plurality of observers, the calibration must be carried out so that no unpleasantness will be given to the observers.

For example, when a presentation is to be made by projecting an image through the conventional projector, the projector performs the calibration prior to the presentation, but not during the presentation.

However, the influence of the ambient light may be varied during the presentation, that is, during display of the image. For example, the image appearance will be varied when the external light changes.

In this case, the observers will be kept waiting as the calibration of the projector is being carried out after interruption of the presentation. If the calibration of the projector is to be performed in consideration of the influence of ambient light, both the color and brightness must be calibrated. If the calibration relating to both the color and brightness is made each time when the ambient light changes, the observers will be kept waiting for a further time period.

BRIEF SUMMARY OF THE INVENTION

The present invention may provide a projection system, projector, program, information storage medium and image processing method which can execute an image calibration in consideration of influence of the ambient light while reducing any unpleasantness to observers.

To this end, a first aspect of the present invention relates to a projection system including:

a measurement means for measuring a calibration image in an image display area and for outputting measurement data;

a judgment means for judging whether or not image information of a normal image different from the calibration image has been inputted;

a calibration information output means for outputting calibration information used for projecting the calibration image;

an update means for updating predetermined correction information based on the measurement data and information indicating an ideal image appearance;

a correction means for correcting the image information based on the updated correction information; and a projection type image display means for projecting the calibration image onto the image display area based on the calibration information and projects the normal image onto the image display area based on the corrected image information, wherein the calibration information output means starts outputting the calibration information when the judgment means judges that the image information of the normal image is not inputted while the calibration information has not been outputted.

A second aspect of the present invention relates to a projection system including:

a measurement section which measures a calibration image in an image display area and outputs measurement data;

a judgment section which judges whether or not image information of a normal image different from the calibration image has been inputted;

a calibration information output section which outputs calibration information used for projecting the calibration image;

an update section which updates predetermined correction information based on the measurement data and information indicating an ideal image appearance;

a correction section which corrects the image information based on the updated correction information; and a projection type image display section which projects the calibration image onto the image display area based on the calibration information and projects the normal image onto the image display area based on the corrected image information, wherein the calibration information output section starts outputting the calibration information when the judgment section judges that the image information of the normal image is not inputted while the calibration information has not been outputted.

A third aspect of the present invention relates to a projector including:

a measurement means for measuring a calibration image in an image display area and outputting measurement data;

a judgment means for judging whether or not image information of a normal image different from the calibration image has been inputted;

a calibration information output means for outputting calibration information used for projecting the calibration image;

an update means for updating predetermined correction information based on the measurement data and information indicating an ideal image appearance;

a correction means for correcting the image information based on the updated correction information; and a projection type image display means for projecting the calibration image onto the image display area based on the calibration information and projects the normal image onto the image display area based on the corrected image information, wherein the image display area is an area onto which an image projected by the projection type image display means is displayed, wherein the measurement means derives XYZ values by measuring the projected calibration image, and wherein the calibration information output means starts outputting the calibration information when the judgment means judges that the image information of the normal image is not inputted while the calibration information has not been outputted.

A fourth aspect of the present invention relates to a projector including:

a measurement section which measures a calibration image in an image display area and outputs measurement data;

a judgment section which judges whether or not image information of a normal image different from the calibration image has been inputted;

a calibration information output section which outputs calibration information used for projecting the calibration image;

an update section which updates predetermined correction information based on the measurement data and information indicating an ideal image appearance;

a correction section which corrects the image information based on the updated correction information; and a projection type image display section which projects the calibration image onto the image display area based on the calibration information and projects the normal image onto the image display area based on the corrected image information, wherein the image display area is an area onto which an image projected by the projection type image display section is displayed, wherein the measurement section derives XYZ values by measuring the projected calibration image, and wherein the calibration information output section starts outputting the calibration information when the judgment section judges that the image information of the normal image is not inputted while the calibration information has not been outputted.

A fifth aspect of the present invention relates to a computer-readable program causing a computer to function as:

A measurement control means for causing a measurement means to measure a calibration image in an image display area and to output measurement data;

a judgment means for judging whether or not image information of a normal image different from the calibration image has been inputted;

a calibration information output means for outputting calibration information used for projecting the calibration image;

an update means for updating predetermined correction information based on the measurement data and information indicating an ideal image appearance;

a correction means for correcting the image information based on the updated correction information; and a display control means for causing a projection type image display means to perform display operation, the projection type image display means projecting the calibration image onto the image display area based on the calibration information and projects the normal image onto the image display area based on the corrected image information, wherein the calibration information output means starts outputting the calibration information when the judgment means judges that the image information of the normal image is not inputted while the calibration information has not been outputted.

A sixth aspect of the present invention relates to an information storage medium storing a computer-readable program causing a computer to function as:

a measurement control means for causing a measurement means to measure a calibration image in an image display area and to output measurement data;

a judgment means for judging whether or not image information of a normal image different from the calibration image has been inputted;

a calibration information output means for outputting calibration information used for projecting the calibration image;

an update means for updating predetermined correction information based on the measurement data and information indicating an ideal image appearance;

a correction means for correcting the image information based on the updated correction information; and a display control means for causing a projection type image display means to perform display operation, the projection type image display means projecting the calibration image onto the image display area based on the calibration information and projects the normal image onto the image display area based on the corrected image information, wherein the calibration information output means starts outputting the calibration information when the judgment means judges that the image information of the normal image is not inputted while the calibration information has not been outputted.

A seventh aspect of the present invention relates to an image processing method including:

projecting calibration image onto an image display area when image information of normal image has not been inputted;

measuring the projected calibration image;

updating color correction information for correcting color of image information, based on XYZ values from the measurement data;

updating brightness correction information for correcting brightness of the image information, based on a luminance value from the measurement data;

correcting the image information based on the color correction information and correcting the corrected image information based on the brightness correction information, when the image information of the normal image has been inputted; and projecting the normal image based on the corrected image information.

According to the present invention, the image appearance can automatically be regulated at a point when the display of the normal image is interrupted, even though the image appearance is varied by the ambient light changing during display of the normal image, because the calibration can automatically be executed if the image information is not inputted.

Thus, the calibration can automatically be executed without keeping an observer waiting or without any operator's operation. At the same time, any unpleasantness given to the observer during calibration can be reduced.

By updating the correction information, the necessary capacity of memory can be reduced since the calibration can be executed without preliminary providing a plurality of types of correction information for a plurality of different environments.

The measurement data may include a data indicating XYZ values, a data derived from the XYZ values (e.g., coordinate values in a predetermined color space or xy chromaticity values) and a data for deriving the XYZ values (e.g., RGB values). The term "XYZ" used herein is a kind of device independent color under the international standards which has been defined by *Commission Internationale de l'Eclairage* (CIE). XYZ values can be converted into RGB values with the Y value directly indicating the brightness. In other words, both the color and brightness of an image can be detected by recognizing the XYZ values in the projected calibration images.

The judgment of image information input may be accomplished, for example, by a technique of performing the judgment based on the presence of a synchronizing signal or Data Enable signal or a technique of performing the judgment based on switching on or switching off.

In the projection systems and projectors, the calibration information output means being capable of outputting first calibration information representing a first calibration image for a first calibration and second calibration information representing a second calibration image for a second calibration, the projection systems and projectors may further include a history storage means for storing a first time on which the latest first calibration is completed and a second time on which the latest second calibration is completed, and the calibration information output means may output the first calibration information prior to the second calibration information, in the case where the stored first time is earlier than the stored second time.

In the program and information storage medium, the calibration information output means being capable of outputting first calibration information representing a first calibration image for a first calibration and second calibration information representing a second calibration image for a second calibration, the program and information storage medium may store a program causing the computer to function as a history storage means for storing a first time on which the latest first calibration is completed and a second time on which the latest second calibration is completed, and the calibration information output means may output the first calibration information prior to the second calibration information, in the case where the stored first time is earlier than the stored second time.

In the image processing method, being capable of outputting first calibration information representing a first calibration image for a first calibration and second calibration information representing a second calibration image for a second calibration, the image processing method may further include storing a first time on which the latest first calibration is completed and a second time on which the latest second calibration is completed, and outputting the first calibration information prior to the second calibration information, in the case where the stored first time is earlier than the stored second time.

Thus, the initially calibrated calibration image is used for calibration. Even though the input of image information is continuously started in the middle of calibration, previous correction information is not been left and the correction information can gradually be adapted to the latest environment.

In the projection systems, projectors, program and information storage medium, the calibration information output means may output the calibration information so that order of the plurality of types of the calibration images to be displayed is changed under a predetermined condition.

The image processing method may include outputting the calibration information so that order of the plurality of types of the calibration images to be displayed is changed under a predetermined condition.

By changing the order of calibration images to be displayed, thus, the calibration can be executed without making the observer weary, even though the calibration is repeatedly carried out.

In the projection systems and the projectors, the calibration information output means being capable of outputting color correction calibration information representing a color correction calibration image for a color correction calibration and brightness correction calibration information representing a brightness correction calibration image for a brightness correction calibration, the projection systems and the projectors may further include a history storage means for storing a first time on which the latest color correction calibration is completed and a second time on which the latest brightness correction calibration is completed, and the calibration information output means may output the color correction calibration information prior to the brightness correction calibration information, in the case where the stored first time is earlier than the stored second time.

In the program and information storage medium, the calibration information output means being capable of outputting color correction calibration information representing a color correction calibration image for a color correction calibration and brightness correction calibration information representing a brightness correction calibration image for a brightness correction calibration, the program and information storage medium may further store a program causing the computer to function as a history storage means for storing a first time on which the latest color correction calibration is completed and a second time on which the latest brightness correction calibration is completed, and the calibration information output means may output the color correction calibration information prior to the brightness correction calibration information, in the case where the stored first time is earlier than the stored second time.

In the image processing method, being capable of outputting color correction calibration information representing a color correction calibration image for a color correction calibration and brightness correction calibration information representing a brightness correction calibration image for a brightness correction calibration, the image processing method may further include storing a first time on which the latest color correction calibration is completed and a second time on which the latest brightness correction calibration is completed, and outputting the color correction calibration information prior to the brightness correction calibration information, in the case where the stored first time is earlier than the stored second time.

Even though only one of the color and brightness of an image can be corrected since time of interruption in displaying the normal image is too short, the not-corrected one of color or brightness can be corrected on the next interruption in displaying the normal image.

Even though the interruption time in displaying the normal image is too short, the image appearance reproduced can gradually be adapted to the latest external environment.

The projection systems and projectors may include:

a color correction information update means for updating the color correction information used for correcting a color of the image, based on XYZ values from the measurement data of the color correction calibration image and base on information indicating the ideal image appearance; and a brightness correction information update means for updating the brightness correction information used for correcting a brightness of the image, based on luminance value from the measurement data of the brightness correction calibration image and based on information indicating the ideal image appearance, and the correction means may correct the image information based on the color correction information, and may correct the corrected image information based on the brightness correction information, and the projection type image display means may display the image based on the corrected image information.

In the program and information storage medium, the update means may include:

a color correction information update means for updating the color correction information used for correcting a color of the image, based on XYZ values from the measurement data of the color correction calibration image and base on information indicating the ideal image appearance; and a brightness correction information update means for updating the brightness correction information used for correcting a brightness of the image, based on luminance value from the measurement data of the brightness correction calibration image and based on information indicating the ideal image appearance, and the correction means may correct the image information based on the color correction information, and may correct the corrected image information based on the brightness correction information, and the projection type image display means may display the image based on the corrected image information.

In the projection systems, projectors, program and information storage medium, the image information may include RGB signals and a synchronizing signal, and the judgment means may judge whether or not the image information has been inputted, based on the synchronizing signal.

In the image processing method, the image information may include RGB signals and a synchronizing signal, and the method may further include judging whether or not the image information has been inputted, based on the synchronizing signal.

DETAILED DESCRIPTION OF THE EMBODIMENT

The present invention will now be described in connection with a projection system using a liquid crystal projector to which the present invention is applied and with reference to the drawing. Several embodiments described below are not intended to restrict the contents of the invention defined in the accompanying claims. All the components shown in the embodiments are not necessarily essential as resolving means in the invention defined in the accompanying claims.

Overall System

Figure 1:
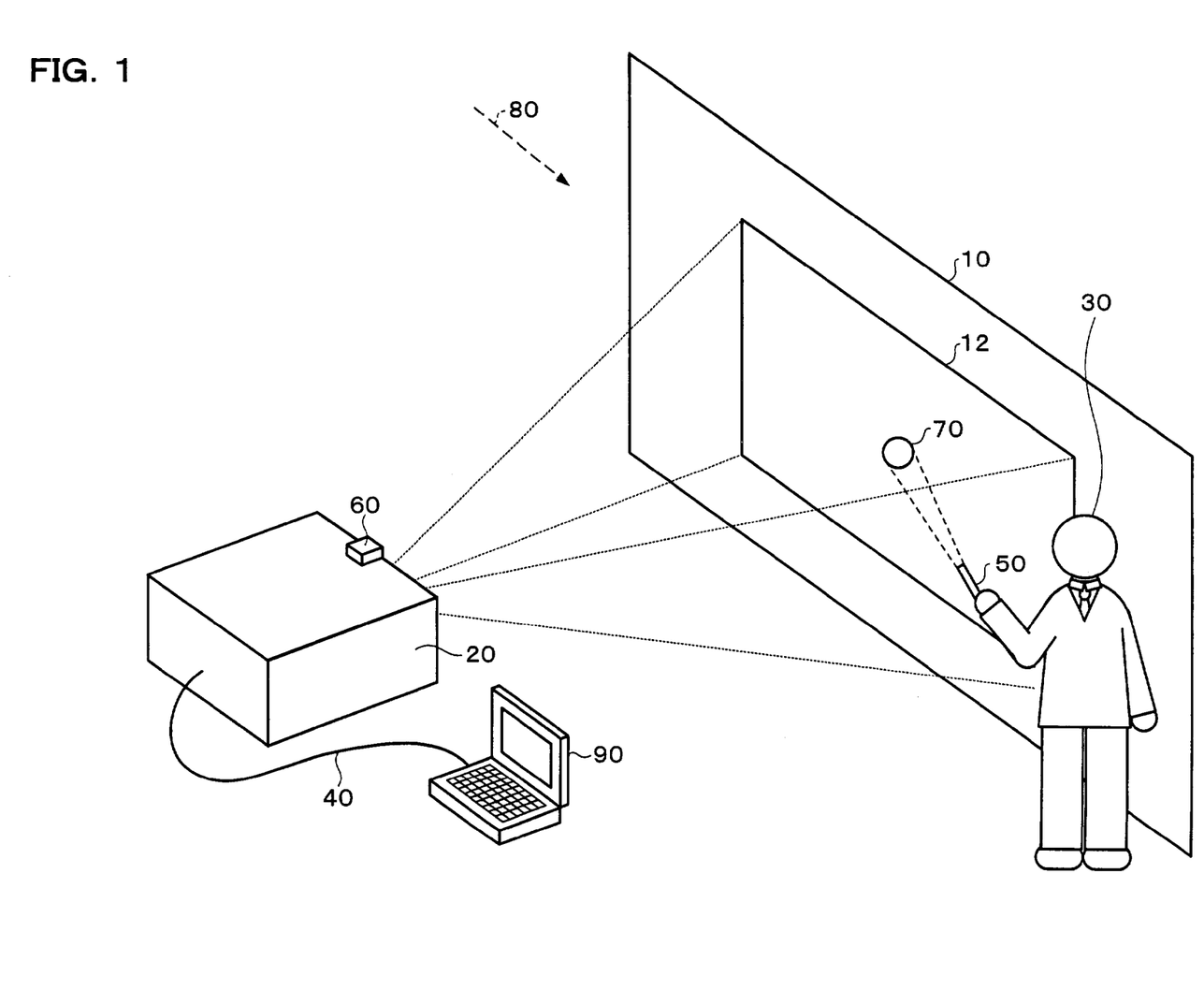
FIG. 1 is a schematic view of a projection system constructed according to one embodiment of the present invention.

FIG. 1 is a schematic view of a projection system constructed according to one embodiment of the present invention.

A projector 20, which is a kind of projection type image display device, is located substantially in front of a screen 10 and projects a presentation image, which is a kind of normal image, based on image signals fed from a note type personal computer (PC) 90 through a cable 40.

A presenter 30 performs a presentation to an observer of the image while pointing a desired location in the image displayed on an image display area 12 of the screen 10 through a spot beam 70 projected from a laser pointer 50.

In such a presentation, the image appearance on the image display area 12 may greatly be varied depending on the type (color or material) of the screen 10 and/or the ambient (external or illuminating) light 80. For example, the same white color may look yellowish or tin white. Furthermore, the same white color may look lighter or darker depending on the ambient light 80.

To accommodate such a variable image appearance, a color light sensor 60, which is a kind of measurement means for measuring calibration images to derive XYZ values, is provided. The XYZ values measured by the color light sensor 60 is then inputted into the projector 20.

The term "XYZ values" used herein is a kind of device independent color in the international standards defined by *Commission Internationale de l'Eclairage* (CIE). The XYZ values can be converted into RGB values with the Y-value directly indicating the brightness. By detecting the XYZ values in the projected calibration images, therefore, both the color and brightness of the image can be detected.

The projector 20 updates correction information for correcting the image information to project the image so that a target image appearance can be reproduced based on the XYZ values from the color light sensor 60.

Since the ambient light 80 frequently varies during execution of the presentation, it is desirable that the presenter 30 always performs the calibration to realize a desired image appearance.

However, the observer will be kept waiting and thus have an unpleasantness when the display of presentation image is interrupted to display the calibration images or when the color and brightness of the image are calibrated each time when the ambient light 80 varies.

According to this embodiment, the projector 20 is designed to first judge whether or not an image signal has been inputted from the note PC 90 and then to perform the calibration under such a condition as the image signal is not inputted. Furthermore, the projector 20 performs the calibration of at least one of the color and brightness by alternately executing the calibrations for color and brightness, even though the image signal is not inputted for a short time.

Functional Blocks

Figure 2:
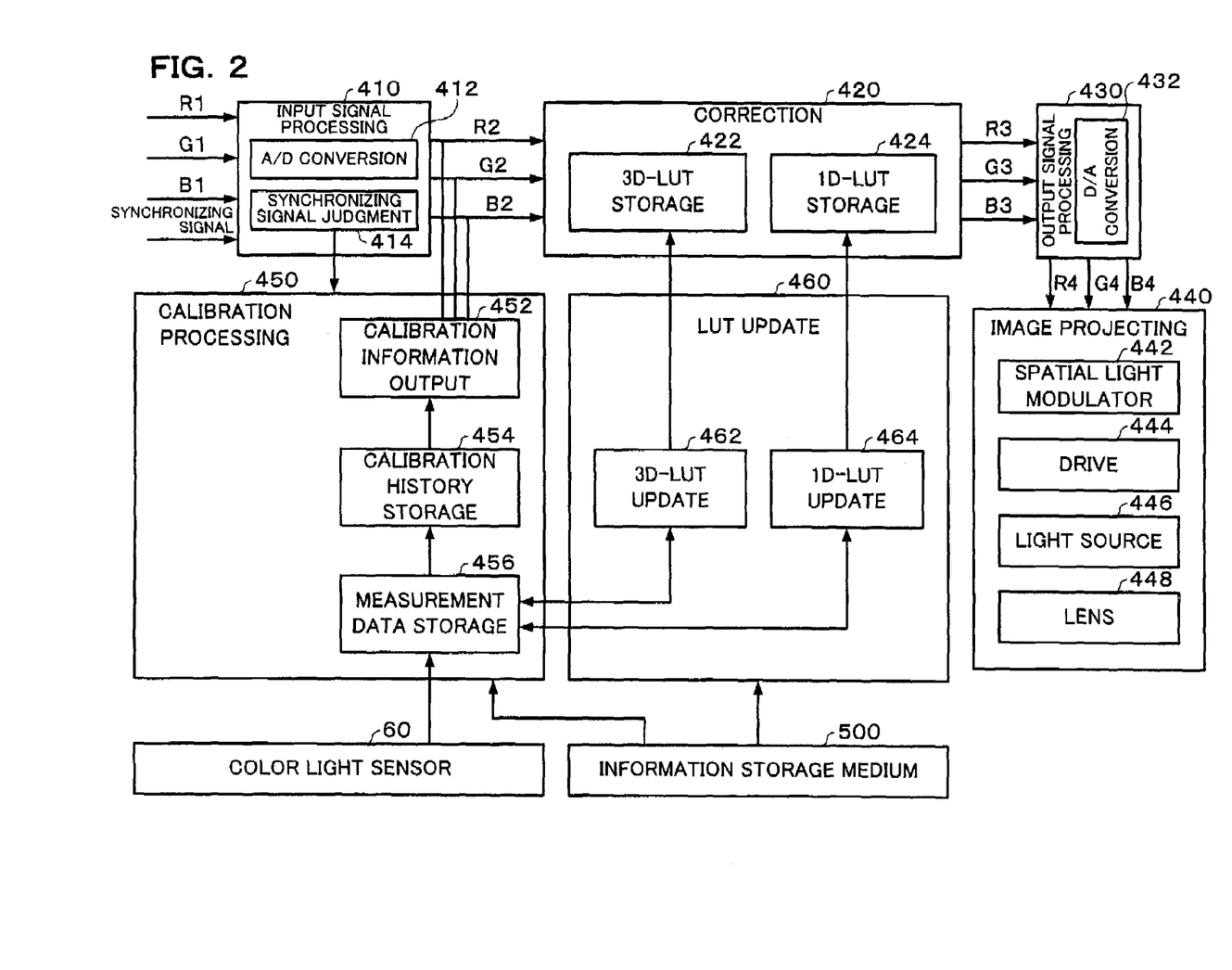
FIG. 2 is a functional block diagram of an image processing section in a projector according to one embodiment of the present invention.

The functional blocks of the projector 20 for realizing the aforementioned functions will be described.

FIG. 2 is a functional block diagram of an image processing section in a projector according to one embodiment of the present invention.

An image processing section includes an input signal processing section 410 for independently inputting image signals (or RGB signals) and synchronizing signals, a correction section 420 for correcting the color and brightness of the image, an output signal processing section 430, an image projecting section 440, a calibration processing section 450 for storing the measurement data from the color light sensor 60 and a lookup table (LUT) update section 460.

The input signal processing section 410 includes an A/D conversion section 412 for respectively converting analog image signals R1, G1 and B1 into digital image signals R2, G2 and B2 and a synchronizing signal judgment section 414 for judging whether or not a synchronizing signal has been inputted.

The A/D conversion section 412 outputs the digitally converted image information (R2, G2 and B2) toward the correction section 420. The synchronizing signal judgment section 414 transmits the presence or absence of the synchronizing signal to the calibration processing section 450.

The correction section 420 includes a 3D-LUT storage section 422 for storing a three-dimensional lookup table (3D-LUT) which is a kind of color correction information and a one-dimensional lookup table (1D-LUT) storage section 424 for storing a 1D-LUT which is a kind of brightness correction information.

More specifically, the 1D-LUT storage section 424 has stored one or both of gamma table and color balance table as part of the brightness correction information. The 3D-LUT storage section 422 has stored one or both of color gamut correction table and color temperature correction table as part of the color correction information.

The correction section 420 outputs new image information (R3, G3 and B3) obtained from correction of the previous image information (R2, G2 and B2) toward the output signal processing section 430.

The output signal processing section 430 includes a D/A conversion section 432 which converts the digital image signals (R3, G3 and B3) into analog image signals (R4, G4 and B4), these analog image signals being then outputted toward the image projecting section 440.

The image projecting section 440 includes a spatial light modulator 442, a drive 444 for driving the spatial light modulator 442, a source of light 446 and a lens 448.

The drive 444 drives the spatial light modulator 442 based on the analog image signals (R4, G4 and B4). The image projecting section 440 projects the light from the light source 446 through the spatial light modulator 442 and lens 448. Thus, the projector 20 will project the image.

The calibration processing section 450 includes a calibration information output section 452, a calibration history storage section 454 and a measurement data storage section 456.

The calibration information output section 452 outputs the calibration information (R2, G2 and b2).

More specifically, the projector 20 according to this embodiment is designed to project four images of red (R), green (G), blue (B) and white (W) colors as color correction calibration images and also to project two images of white-color and gray-color which is lower than the white color in gray scale, as brightness correction calibration images. Furthermore, the projector 20 can alternately project a set of four color correction calibration images and another set of two brightness correction calibration images.

To this end, the calibration information output section 452 has stored six types of calibration information used to display the six types of calibration images, and selects and outputs desired calibration information based on the calibration history in the calibration history storage section 454.

The color light sensor 60 measures the XYZ values for the respective calibration images while the measurement data storage section 456 stores the measurement data (or XYZ values).

The calibration history storage section 454 stores the history that relates to the calibration using the calibration image.

The calibration information output section 452 selects and outputs the calibration information so that a calibration image to be next displayed can be displayed, based on the information from the synchronizing signal judgment section 414 as well as the calibration history in the calibration history storage section 454 when no synchronizing signal is inputted.

The LUT update section 460, which is a kind of update means, includes a 3D-LUT update section 462 for updating the 3D-LUT stored in the 3D-LUT storage section 422 and a 1D-LUT update section 464 for updating the 1D-LUT stored in the 1D-LUT storage section 424.

The 3D-LUT update section 462 converts the measurement data (or XYZ values) into coordinate values in a color space (e.g., L*a*b* space or L*u*v* space) and updates the 3D-LUT based on the coordinate values, at a time point when all the new measurement data relating to four color correction calibration images have been provided.

The 1D-LUT update section 464 determines Y-value indicating brightness value based on the measurement data (or XYZ values) and updates the 1D-LUT based on the determined Y-value, at a point when all the new measurement data relating to the two brightness correction calibration images have been provided.

Hardware

Figure 6:
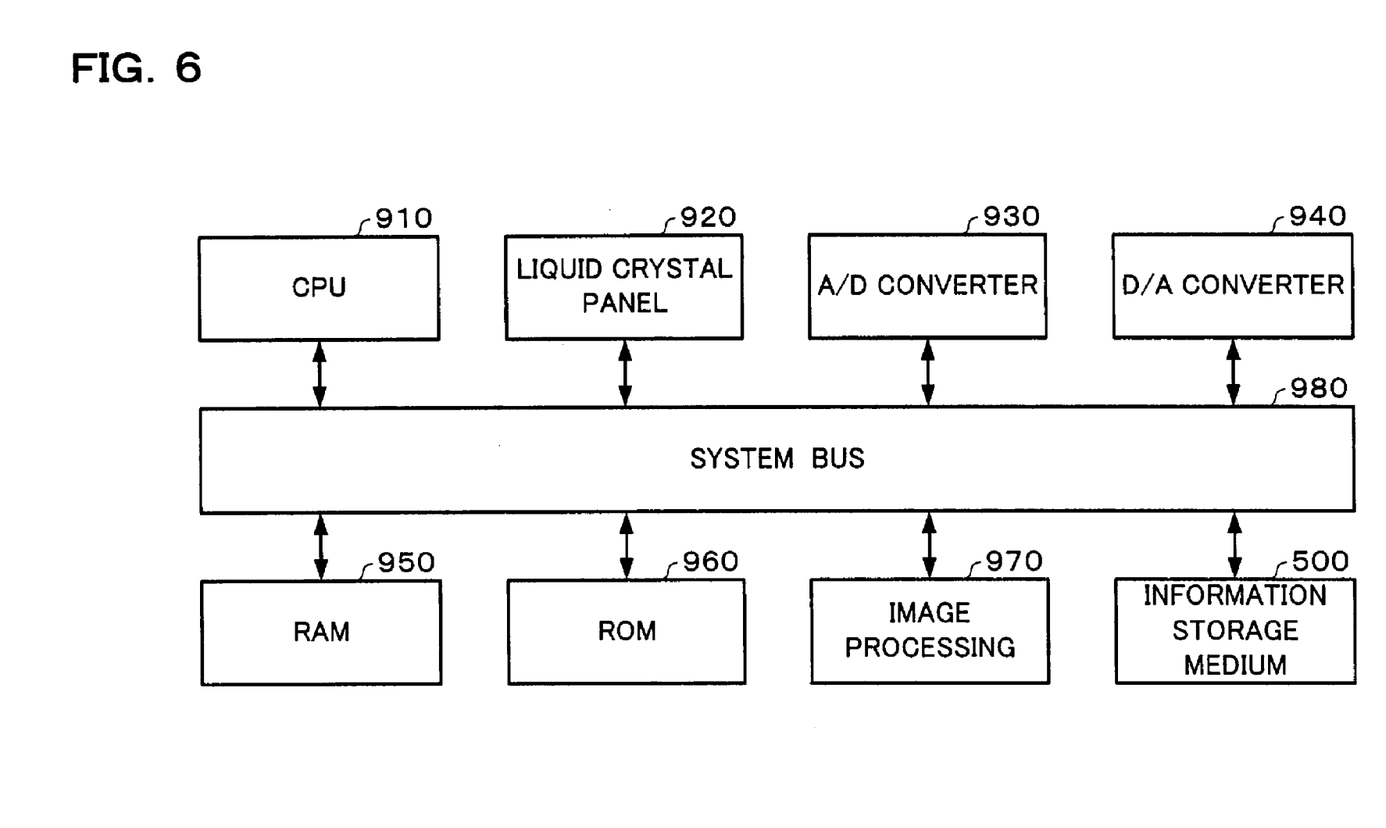
FIG. 6 is a hardware block diagram of an image processing section according to one embodiment of the present invention.

Hardware usable in the respective section of the abovementioned image processing section will be described below.

FIG. 6 is a hardware block diagram of an image processing section according to one embodiment of the present invention.

For example, the A/D conversion section 412 may be an A/D converter 930; the synchronizing signal judgment section 414 may be CPU 910; the D/A conversion section 432 may be a D/A converter 940; the spatial light modulator 442 may be a liquid crystal panel 920; the drive 444 may be ROM 960 stored a liquid crystal light valve driver; and the correction section 420, calibration processing section 450 and LUT update section 460 may be CPU 910, RAM 950 and image processing circuit 970, respectively. These sections can swap information with one another through a system bus 980. Each of these sections may be realized in a hardware manner such as circuits or in a software manner such as drivers.

As shown in FIG. 2, the functions of the aforementioned sections may be realized by reading programs from an information storage medium 500. The information storage medium 500 may be in any form of various forms such as CD-ROM, DVD-ROM, ROM, RAM and HDD. The information reading process may be either of contact or non-contact type.

In place of the information storage medium 500, a computer may be used to function as the respective one of the aforementioned sections by downloading programs from a host device or the like through a network.

In addition, the color light sensor 60 may take any hardware described below.

For example, a color filter and photodiode for selectively transmitting each of the tristimulus values of XYZ, an A/D converter for converting analog signals from a photodiode into digital signals, an OP amplifier for amplifying digital signals, or the like.

Flow of Image Processing

Flow of image processing using the aforementioned sections will be described below.

Figure 3:
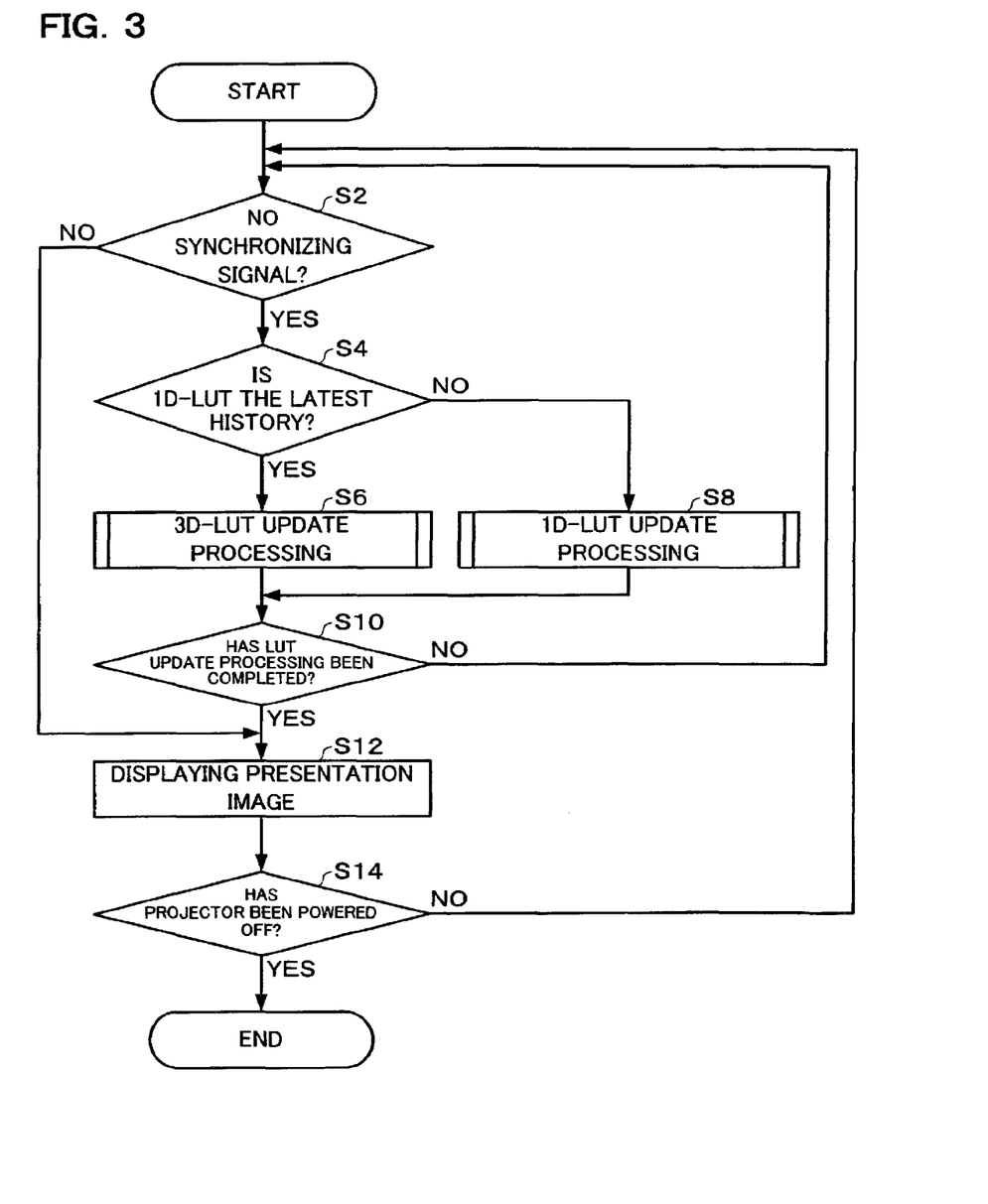
FIG. 3 is a flowchart illustrating an image processing procedure according to one embodiment of the present invention.

FIG. 3 is a flowchart illustrating an image processing procedure according to one embodiment of the present invention.

Prior to start of the image processing shown in FIG. 3, the projector 20 executes the calibration and the LUT update section 460 generates 3D-LUT and 1D-LUT for setting up the image processing shown in FIG. 3, immediately after the projector 20 has been powered on. This updating step will be described later. The first judgment relating to the power-on can be made if no data is inputted into the calibration history storage section 454 or measurement data storage section 456, for example.

When the 3D-LUT and 1D-LUT have been generated, the synchronizing signal judgment section 414 judges whether or not a synchronizing signal is inputted into the projector 20 (step S2).

If no synchronizing signal is inputted into the projector 20, the calibration information output section 452 judges whether or not the newest calibration history is the calibration history for updating the 1D-LUT, based on the calibration history in the calibration history storage section 454 (step S4).

It is assumed herein that the projector 20 initially performs the 3D-LUT updating process (step S6).

Figure 4:
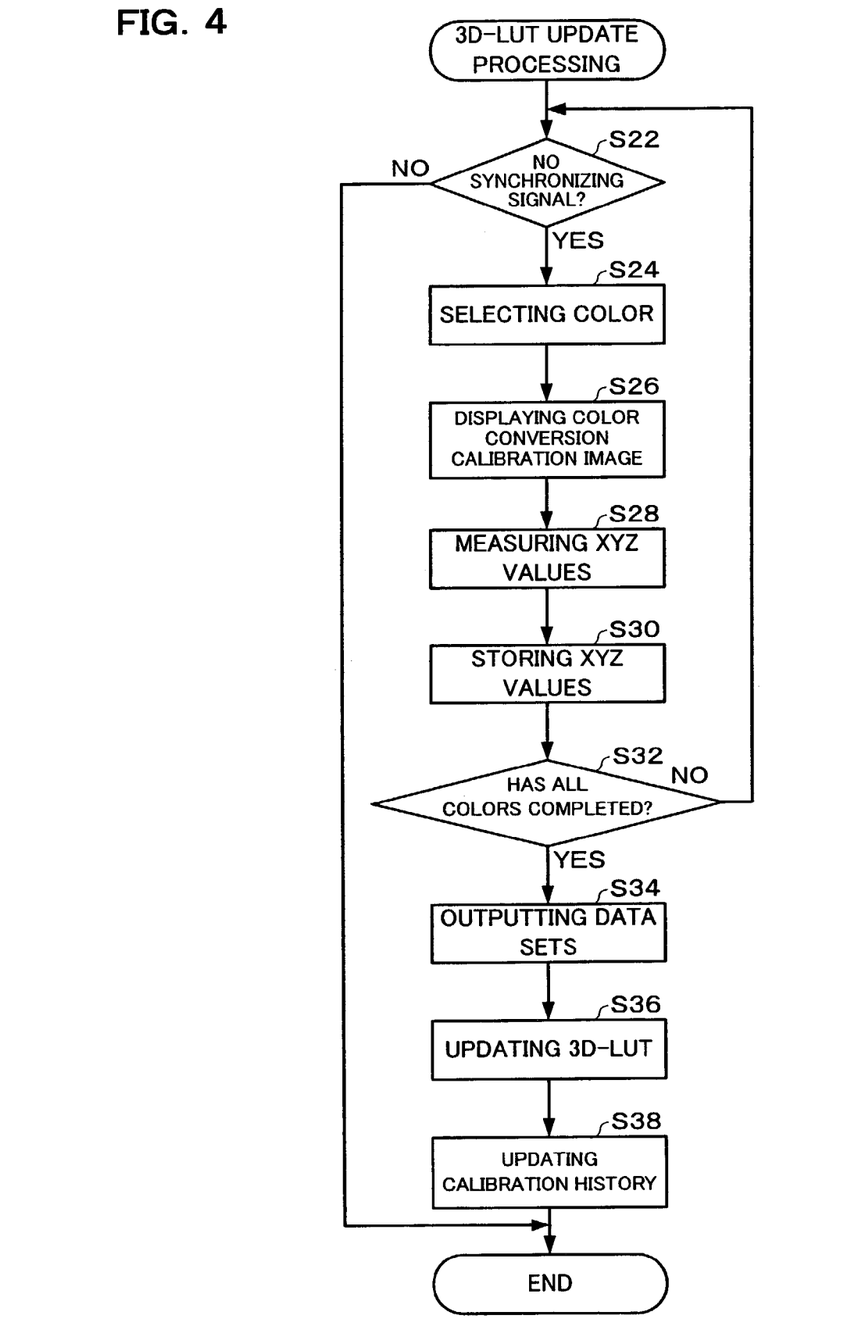
FIG. 4 is a flowchart illustrating a 3D-LUT update processing according to one embodiment of the present invention.

The 3D-LUT updating process will be described.

FIG. 4 is a flowchart illustrating a 3D-LUT updating process according to one embodiment of the present invention.

If it is judged by the synchronizing signal judgment section 414 that no synchronizing signal is inputted (step S22), the calibration information output section 452 selects any one of R-, G-, B- and W-colors (step S24) and then outputs calibration information used to project a calibrations image for color conversion for the selected color. The projector 20 then projects the calibrations image for color conversion based on this outputted calibration information (step S26).

The color light sensor 60 measures the XYZ values in the calibrations image for color conversion on the image display area 12 (step S28). The measurement data storage section 456 stores the XYZ values measured by the color light sensor 60 as measurement data (step S30).

If the calibration information relating to all of four calibrations images for color conversion has not been outputted (step S32), the projector 20 repeats the procedure executed from the judgment relating to the synchronizing signal (step S22) to the judgment relating to the completion of measurement for all the four calibration images (step S32).

If a synchronizing signal is inputted before the measurement for four calibration images is completed (step S22), the projector 20 interrupts the correction of color and will again measure the four calibration images at the next 3D-LUT updating processing (step S6).

The measurement data storage section 456 outputs the set of measurement data relating to the four colors toward the 3D-LUT update section 462 at a point when the measurement data relating to all the four calibration images have been provided (step S34).

The 3D-LUT update section 462 updates the 3D-LUT stored in the 3D-LUT storage section 422, based on the coordinate values in the color space according to the set of measurement data (step S36).

The calibration history storage section 454 stores the updated 3D-LUT (step S38).

In such a manner, the projector 20 updates the 3D-LUT and projects an image corrected in color by using the updated 3D-LUT.

If the newest sensing history is not 1D-LUT, the 1D-LUT is updated (step S8).

Figure 5:
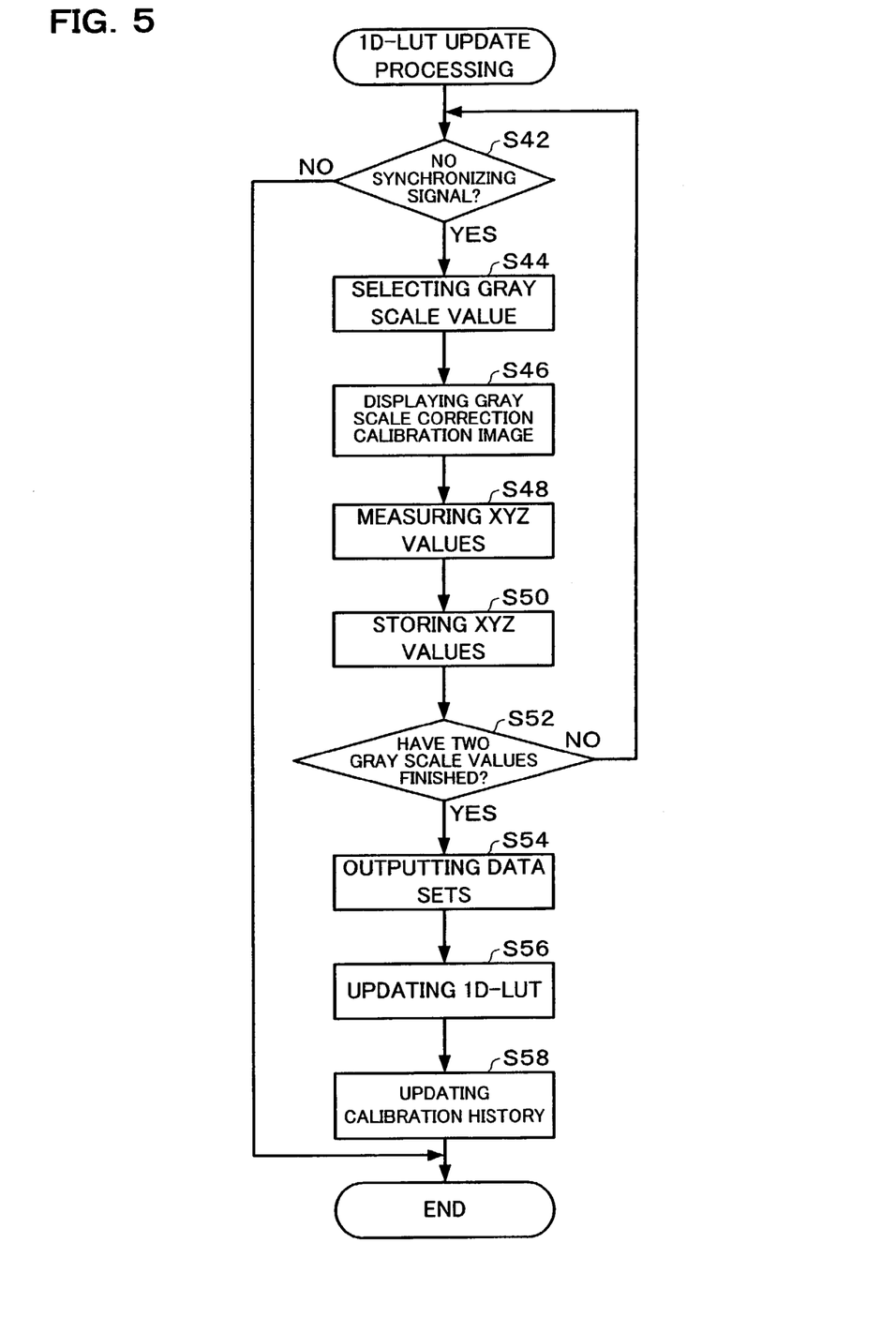
FIG. 5 is a flowchart illustrating a 1D-LUT update processing according to one embodiment of the present invention.

The 1D-LUT updating process will now be described.

FIG. 5 is a flowchart illustrating a 1D-LUT update processing according to one embodiment of the present invention.

If it is judged by the synchronizing signal judgment section 414 that no synchronizing signal is inputted (step S42), the calibration information output section 452 selects either gray scale value (or input signal value) of the white or gray color (step S44) and then outputs calibration information used to project a calibration image for gray scale correction for the selected gray scale. The projector 20 then projects the calibration image for gray scale correction based on the above calibration information (step S46).

The color light sensor 60 measures the XYZ values in the calibration image for gray scale correction on the image display area 12 (step S48). The measurement data storage section 456 stores the XYZ values from the color light sensor 60 as measurement data (step S50).

If the output of the two-gray-scale calibration information for the calibration image for gray scale correction is still not completed (step S52), the projector 20 repeats the procedure executed from the judgment of synchronizing signal (step S42) to the judgment of the completion of measurement for two-gray-scale calibration information (step S52).

If a synchronizing signal is inputted before the measurement of two gray scale calibration images is completed (step S52), the projector interrupts the correction of brightness and will again measure two gray scale calibration images at the next 1D-LUT updating process (step S8).

At a point when the measurement data of all the gray scale calibration images have been provided, the measurement data storage section 456 outputs the set of measurement data relating to two gray scale values toward the 1D-LUT update section 464 (step S54).

The 1D-LUT update section 464 updates the 1D-LUT stored in the 1D-LUT storage section 424, based on the Y-value from the measurement data (step S56).

The calibration history storage section 454 stores information representing the time on which the update of the 1D-LUT is completed.

In such a manner, the projector 20 updates the 1D-LUT and projects an image corrected in brightness by using the updated 1D-LUT.

The calibration history storage section 454 outputs a command indicating the stop of output for the calibration information toward the calibration information output section 452 when the updating process for the 3D-LUT and 1D-LUT is completed.

If an image signal (R1, G1 or B1) and synchronizing signal are again inputted into the projector 20, the latter projects a presentation signal based on the image signal (step S12).

When the projector 20 is powered off (step S14), it terminates the image processing.

According to this embodiment, the calibration can be executed without giving any unpleasantness to the observer, since the calibration is performed for a time period for which no presentation image is displayed, that is, when one presenter 30 is interchanged to another presenter or when one period for a certain presentation is terminated, by automatically performing the calibration under such a condition as no synchronizing signal is inputted.

In addition, this embodiment can effectively execute the calibration without interruption of the presentation by the presenter 30 since the presentation will not be interrupted for calibration and since the calibration can automatically carried out between the successive presentations.

Particularly, when the 3D-LUT and 1D-LUT are to be updated for correcting the color and brightness of the image, an LUT reflected by the newest environment information can be generated by updating the earlier updated LUT or an LUT having a longer period between the previous and present updating time points even if the presentation is interrupted for a reduced time period. As a result, the image appearance suitable for the newest environment can be reproduced.

In the case where the synchronizing signal is not detected by the synchronizing signal judgment section 414, the projector 20 starts updating at least one of its 3D-LUT and 1D-LUT. Upon updating 3D-LUT and 1D-LUT, priority is given to one of the 3D-LUT update and 1D-LUT update as described below.

The calibration history storage section 454 stores first information representing a time on which the latest update of the 3D-LUT was completed. Also, the calibration history storage section 454 stores second information representing a time on which the latest update of the 1D-LUT was completed. The calibration processing section 450 compares the first information to the second information so as to determine which of the 3D-LUT and 1D-LUT was updated earlier. If the 3D-LUT was updated earlier than the 1D-LUT (that is, the 3D-LUT has remained unchanged for a longer time period than the 1D-LUT), the calibration processing section 450 starts updating the 3D-LUT prior to updating the 1D-LUT, and vice versa. Although it is not shown in Figures, the projector 20 includes a timer that supplies time information to the calibration history storage section 454.

The update of 3D-LUT and 1D-LUT of this embodiment may be called as calibrations.

The capacity of memory required by the 3D-LUT and 1D-LUT storage sections 422, 424 can be reduced by taking a system for updating the correcting data (3D-LUT and 1D-LUT), rather than preliminary provision of the necessary correcting data.

Since the color light sensor 60 can measure the XYZ values for simultaneously detecting the color and brightness of the respective one of the calibration images, the projector 20 can appropriately detect the reflection on the screen 10 in addition to the ambient light 80. This provides more accurate calibration.

Modifications

Although the present invention has been described as to the preferred embodiment thereof, the present invention is not limited to this embodiment.

Although the preferred embodiment of the present invention has been described as to the calibration executed when no synchronizing signal is inputted, the present invention may similarly be applied to a calibration executed when a signal indicating the presence or absence of normal image (e.g., Data Enable) or a calibration executed when the setting of trapezoidal distortion or resolution in the projector 20 is being changed, for example.

For example, this can be accomplished by providing a judgment section for judging the presence or absence of Data Enable signal input in place of the synchronizing signal judgment section 414 or a setting change judgment section for judging whether or not a setting change switch on the projector 20 or a remote controller therein is turned on.

Although the preferred embodiment has been described as to a plurality of monochromatic calibration images which are sequentially displayed, the order of images to be displayed may be changed. Alternatively, still or animated images relating to the manufacture of the projector 20 or the logo of a company to which the presenter 30 belongs may be displayed.

Furthermore, any image irrelative to the calibration such as logo, letter, character and animation may be displayed on a portion of the image display area 12 not measured by the color light sensor 60.

Thus, the presentation can be executed without wearying the observer on calibration.

Although the embodiment has been described as to the calibration information output section 452 which has stored six types of calibration information required at the minimum, the calibration information output section 452 may have stored seven or more types of calibration information which can suitably be selected or which can be outputted in any of various orders of output.

Although the embodiment has been described as to the calibration information output section 452 which has previously stored the calibration information to be selected and outputted, the calibration information output section 452 may be designed to generate and output new calibration information for each monochromatic calibration image.

For example, if it is wanted to display a calibration image including, in combination, a foreground image part such as a log, character or moving image and a background image part, the calibration information output section 452 may be designed to output the combination of the foreground image calibration information with the background image calibration information.

Although the embodiment has been described as to the color correcting 3D-LUT, a color converting matrix may similarly be used in the present invention. With use of the color correcting matrix, the chromaticity value (e.g., xy values) will be used in place of the coordinate values in the color space.

Although the embodiment has been described as to the color light sensor 60 which is a kind of measurement means for outputting the XYZ values, another kind of measurement means may be used to output data derived from the XYZ values (e.g., coordinate values in a predetermined color space or xy chromaticity values) or data deriving the XYZ values (e.g., RGB values).

The present invention may similarly be applied to any of various projection type image display devices other then the liquid crystal projector. Such projection type image display devices may include a projector using a digital micromirror device (DMD) or a cathode ray tube (CRT) type projector. DMD is the trademark possessed by U. S. Texas Instruments Company. The projector may be of a back projection type, rather than the front projection type.

The present invention may similarly be effective on any of various fields other then the filed of presentation, such as meeting, medical application, design, fashion, sales, commercial, education, movie, TV, video, game and so on.

The image processing function in the projector 20 may be accomplished by a simple image display device (e.g., only the projector 20) or by a plurality of distributed processing sections (e.g., the projector 20 and the note type personal computer 90).

If the image information such as RGB signals are of digital type, the A/D conversion section 412 as shown in FIG. 2 can be omitted. If the image display device such as the spatial light modulator 442 can digitally be driven, the D/A conversion section 432 may be omitted.

What is claimed is:

1. A projection system comprising:
    a measurement means for measuring a calibration image in an image display area and for outputting measurement data;
    a judgment means for judging whether or not image information of a normal image different from the calibration image has been inputted;
    a calibration information output means for outputting calibration information used for projecting the calibration image;
    an update means for updating predetermined correction information based on the measurement data and information indicating an ideal image appearance;
    a correction means for correcting the image information based on the updated correction information; and
    a projection type image display means for projecting the calibration image onto the image display area based on the calibration information and projects the normal image onto the image display area based on the corrected image information,
    wherein the calibration information output means starts outputting the calibration information when the judgment means judges that the image information of the normal image is not inputted while the calibration information has not been outputted, and stops outputting the calibration information when the judgement means judges that the image information of the normal image is inputted while the calibration information has been outputted.

2. The projection system as defined by claim 1, the calibration information output means being capable of outputting first calibration information representing a first calibration image for a first calibration and second calibration information representing a second calibration image for a second calibration, the projection system further comprising:
    a history storage means for storing a first time on which the latest first calibration is completed and a second time on which the latest second calibration is completed,
    wherein the calibration information output means outputs the first calibration information prior to the second calibration information, in the case where the stored first time is earlier than the stored second time.

3. The projection system as defined by claim 2,
    wherein the calibration information output means outputs the calibration information so that order of the plurality of types of the calibration images to be displayed is changed under a predetermined condition.

4. The projection system as defined by claim 1, the calibration information output means being capable of outputting color correction calibration information representing a color correction calibration image for a color correction calibration and brightness correction calibration information representing a brightness correction calibration image for a brightness correction calibration, the projection system further comprising:
    a history storage means for storing a first time on which the latest color correction calibration is completed and a second time on which the latest brightness correction calibration is completed,
    wherein the calibration information output means outputs the color correction calibration information prior to the brightness correction calibration information, in the case where the stored first time is earlier than the stored second time.

5. The projection system as defined by claim 4, further comprising:
    a color correction information update means for updating the color correction information used for correcting a color of the image, based on XYZ values from the measurement data of the color correction calibration image and based on information indicating the ideal image appearance; and
    a brightness correction information update means for updating the brightness correction information used for correcting a brightness of the image, based on luminance value from the measurement data of the brightness correction calibration image and based on information indicating the ideal image appearance, wherein the correction means corrects the image information based on the color correction information, and corrects the corrected image information based on the brightness correction information, and wherein the projection type image display means displays the image based on the corrected image information.

6. The projection system as defined by claim 5, wherein the image information includes RGB signals and a synchronizing signal, and wherein the judgment means judges whether or not the image information has been inputted, based on the synchronizing signal.

7. A projection system, the system comprising:

a measurement section which measures a calibration image in an image display area and outputs measurement data;

a judgment section which judges whether or not image information of a normal image different from the calibration image has been inputted;

a calibration information output section which outputs calibration information used for projecting the calibration image;

an update section which updates predetermined correction information based on the measurement data and information indicating an ideal image appearance;

a correction section which corrects the image information based on the updated correction information; and a projection type image display section which projects the calibration image onto the image display area based on the calibration information and projects the normal image onto the image display area based on the corrected image information, wherein the calibration information output section starts outputting the calibration information when the judgment section judges that the image information of the normal image is not inputted while the calibration information has not been outputted, and stops outputting the calibration information when the judgment means judges that the image information of the normal image is inputted while the calibration information has been outputted.

8. A projector comprising:

a measurement means for measuring a calibration image in an image display area and outputting measurement data; a judgment means for judging whether or not image information of a normal image different from the calibration image has been inputted;

a calibration information output means for outputting calibration information used for projecting the calibration image;

an update means for updating predetermined correction information based on the measurement data and information indicating an ideal image appearance;

a correction means for correcting the image information based on the updated correction information; and a projection type image display means for projecting the calibration image onto the image display area based on the calibration information and projects the normal image onto the image display area based on the corrected image information, wherein the image display area is an area onto which an image projected by the projection type image display means is displayed, wherein the measurement means derives XYZ values by measuring the projected calibration image, and wherein the calibration information output means starts outputting the calibration information when the judgment means judges that the image information of the normal image is not inputted while the calibration information has not been outputted, and stops outputting the calibration information when the judgment means judges that the image information of the normal image is inputted while the calibration information has been outputted.

9. A projector comprising:

a measurement section which measures a calibration image in an image display area and outputs measurement data;

a judgment section which judges whether or not image information of a normal image different from the calibration image has been inputted;

a calibration information output section which outputs calibration information used for projecting the calibration image;

an update section which updates predetermined correction information based on the measurement data and information indicating an ideal image appearance;

a correction section which corrects the image information based on the updated correction information; and a projection type image display section which projects the calibration image onto the image display area based on the calibration information and projects the normal image onto the image display area based on the corrected image information, wherein the image display area is an area onto which an image projected by the projection type image display section is displayed, wherein the measurement section derives XYZ values by measuring the projected calibration image, and wherein the calibration information output section starts outputting the calibration information when the judgment section judges that the image information of the normal image is not inputted while the calibration information has not been outputted, and stops outputting the calibration information when the judgment means judges that the image information of the normal image is inputted while the calibration information has been outputted.

10. A computer-readable program causing a computer to function as:

a measurement control means for causing a measurement means to measure a calibration image in an image display area and to output measurement data;

a judgment means for judging whether or not image information of a normal image different from the calibration image has been inputted;

a calibration information output means for outputting calibration information used for projecting the calibration image;

an update means for updating predetermined correction information based on the measurement data and information indicating an ideal image appearance;

a correction means for correcting the image information based on the updated correction information; and a display control means for causing a projection type image display means to perform display operation, the projection type image display means projecting the calibration image onto the image display area based on the calibration information and projecting the normal image onto the image display area based on the corrected image information, wherein the calibration information output means starts outputting the calibration information when the judgment means judges that the image information of the normal image is not inputted while the calibration information has not been outputted, and stops outputting the calibration information when the judgment means judges that the image information of the normal image is inputted while the calibration information has been outputted.

11. The program as defined by claim 10, the calibration information output means being capable of outputting first calibration information representing a first calibration image for a first calibration and second calibration information representing a second calibration image for a second calibration, the program further comprising:

a program causing the computer to function as a history storage means for storing a first time on which the latest first calibration is completed and a second time on which the latest second calibration is completed, wherein the calibration information output means outputs the first calibration information prior to the second calibration information, in the case where the stored first time is earlier than the stored second time.

12. The program as defined by claim 11, wherein the calibration information output means outputs the calibration information so that order of the plurality of types of the calibration images to be displayed is changed under a predetermined condition.

13. The program as defined by claim 10, the calibration information output means being capable of outputting color correction calibration information representing a color correction calibration image for a color correction calibration and brightness correction calibration information representing a brightness correction calibration image for a brightness correction calibration, the program further comprising:

a program causing the computer to function as a history storage means for storing a first time on which the latest color correction calibration is completed and a second time on which the latest brightness correction calibration is completed, wherein the calibration information output means outputs the color correction calibration information prior to the brightness correction calibration information, in the case where the stored first time is earlier than the stored second time.

14. The program as defined by claim 13,
wherein the update means comprises:

a color correction information update means for updating the color correction information used for correcting a color of the image, based on XYZ values from the measurement data of the color correction calibration image and base on information indicating the ideal image appearance; and a brightness correction information update means for updating the brightness correction information used for correcting a brightness of the image, based on luminance value from the measurement data of the brightness correction calibration image and based on information indicating the ideal image appearance, wherein the correction means corrects the image information based on the color correction information, and corrects the corrected image information based on the brightness correction information, and wherein the projection type image display means displays the image based on the corrected image information.

15. The program as defined by claim 14,
wherein the image information include RGB signals and a synchronizing signal, and
wherein the judgment means judges whether or not the image information has been inputted, based on the synchronizing signal.

16. An information storage medium storing a computer-readable program causing a computer to function as:

a measurement control means for causing a measurement means to measure a calibration image in an image display area and to output measurement data;

a judgment means for judging whether or not image information of a normal image different from the calibration image has been inputted;

a calibration information output means for outputting calibration information used for projecting the calibration image;

an update means for updating predetermined correction information based on the measurement data and information indicating an ideal image appearance;

a correction means for correcting the image information based on the updated correction information; and a display control means for causing a projection type image display means to perform display operation, the projection type image display means projecting the calibration image onto the image display area based on the calibration information and projects the normal image onto the image display area based on the corrected image information, wherein the calibration information output means starts outputting the calibration information when the judgment means judges that the image information of the normal image is not inputted while the calibration information has not been outputted, and stops outputting the calibration information when the judgment means judges that the image information of the normal image is inputted while the calibration information has been outputted.

17. An image processing method comprising:
projecting calibration image onto an image display area when image information of normal image has not been inputted;
measuring the projected calibration image;
updating color correction information for correcting color of image information, based on XYZ values from the measurement data;
updating brightness correction information for correcting brightness of the image information, based on a luminance value from the measurement data;
correcting the image information based on the color correction information and correcting the corrected image information based on the brightness correction information, when the image information of the normal image has been inputted; and
projecting the normal image based on the corrected image information, and stops outputting the calibration information when the judgment means judges that the image information of the normal image is inputted while the calibration information has been outputted.

18. The image processing method as defined by claim 17, being capable of outputting first calibration information representing a first calibration image for a first calibration and second calibration information representing a second calibration image for a second calibration, the image processing method further comprising:

storing a first time on which the latest first calibration is completed and a second time on which the latest second calibration is completed, outputting the first calibration information prior to the second calibration information, in the case where the stored first time is earlier than the stored second time.

19. The image processing method as defined by claim 18, comprising:

outputting the calibration information so that order of the plurality of types of the calibration images to be displayed is changed under a predetermined condition.

20. The image processing method as defined by claim 17, being capable of outputting color correction calibration information representing a color correction calibration image for a color correction calibration and brightness correction calibration information representing a brightness correction calibration image for a brightness correction calibration, the image processing method further comprising:

storing a first time on which the latest color correction calibration is completed and a second time on which the latest brightness correction calibration is completed, outputting the color correction calibration information prior to the brightness correction calibration information, in the case where the stored first time is earlier than the stored second time.

21. The image processing method as defined by claim 20, wherein the image information includes RGB signals and a synchronizing signal, and wherein the method further includes judging whether or not the image information has been inputted, based on the synchronizing signal.

* * * * *